United States Patent
Park et al.

(10) Patent No.: US 11,012,666 B2
(45) Date of Patent: May 18, 2021

(54) SURROUND CAMERA SYSTEM FOR AUTONOMOUS DRIVING

(71) Applicants: Telme Electronics Inc., Gunpo-si (KR); Chan Duk Park, Seoul (KR)

(72) Inventors: Chan Duk Park, Seoul (KR); Woong Do Park, Anyang-si (KR)

(*) Notice: Subject to any disclaimer, the term of this patent is extended or adjusted under 35 U.S.C. 154(b) by 104 days.

(21) Appl. No.: 15/961,982

(22) Filed: Apr. 25, 2018

(65) Prior Publication Data

US 2018/0338117 A1    Nov. 22, 2018

(30) Foreign Application Priority Data

May 16, 2017  (KR) .................. 10-2017-0060660

(51) Int. Cl.
  *H04N 7/18*   (2006.01)
  *G06K 9/00*   (2006.01)
  (Continued)

(52) U.S. Cl.
  CPC .............. *H04N 7/181* (2013.01); *B60Q 9/00* (2013.01); *B60R 1/00* (2013.01); *G01S 19/13* (2013.01);
  (Continued)

(58) Field of Classification Search
  CPC .... H04N 7/181; G06K 9/00791; G06K 9/209; G06K 9/00805; G01S 19/13; G01S 19/52; G05D 1/0278; G05D 1/0246; G05D 2201/0213; B60Q 9/00; B60Q 9/008; B60Q 1/52; B60R 1/00; B60R 2300/8066;
  (Continued)

(56) References Cited

U.S. PATENT DOCUMENTS

| 2004/0196146 A1* | 10/2004 | Harter, Jr. ........... B60Q 1/0023 340/435 |
| 2010/0141736 A1* | 6/2010 | Hack ..................... G01C 11/00 348/36 |

(Continued)

FOREIGN PATENT DOCUMENTS

| JP | 5709460 B2 | 3/2015 |
| KR | 10-2011-0011831 A | 2/2011 |

(Continued)

*Primary Examiner* — Richard T Torrente
(74) *Attorney, Agent, or Firm* — KORUS Patent, LLC; Seong Il Jeong

(57) ABSTRACT

Disclosed herein is a surround camera system for autonomous driving. The surround camera system includes: at least one forward surveillance camera configured to monitor a region in front of a vehicle; at least one backward surveillance camera configured to monitor a region behind the vehicle; one or more side surveillance cameras configured to monitor both sides alongside the vehicle; a monitoring means configured to display each of acquired images; and a video control unit configured to process the images acquired via the forward surveillance camera, the backward surveillance camera, and the side surveillance camera, to transmit the processed images to the monitoring means, to detect a target object from the acquired images, analyze the target object, and issue a warning to a driver, and to control the electronic control unit of the vehicle; wherein a 360-degree omnidirectional region around the vehicle is monitored.

1 Claim, 4 Drawing Sheets

(51) Int. Cl.
  *G05D 1/02*  (2020.01)
  *B60R 1/00*  (2006.01)
  *B60Q 9/00*  (2006.01)
  *G01S 19/13*  (2010.01)
  *G06K 9/20*  (2006.01)
  *G01S 19/52*  (2010.01)
  *G06T 3/00*  (2006.01)
  *G06T 7/00*  (2017.01)

(52) U.S. Cl.
  CPC ......... *G05D 1/0246* (2013.01); *G05D 1/0278* (2013.01); *G06K 9/00791* (2013.01); *G06K 9/00805* (2013.01); *G06K 9/209* (2013.01); *B60R 2300/105* (2013.01); *B60R 2300/108* (2013.01); *B60R 2300/303* (2013.01); *B60R 2300/8066* (2013.01); *B60R 2300/8093* (2013.01); *G01S 19/52* (2013.01); *G05D 2201/0213* (2013.01); *G06T 3/0018* (2013.01); *G06T 7/0008* (2013.01)

(58) Field of Classification Search
  CPC ...... B60R 2300/108; B60R 2300/8093; B60R 2300/303; B60R 2300/105; B60R 2300/8053; B60R 2300/804; B60W 2420/42; B60W 2550/30; B60W 2550/12; B60W 2050/143; B60W 2050/146; B60W 50/14; B60W 40/02; B60W 30/14; B60Y 2300/14
  See application file for complete search history.

(56) References Cited

U.S. PATENT DOCUMENTS

| | | | | |
|---|---|---|---|---|
| 2014/0067206 | A1* | 3/2014 | Pflug | B60W 10/04 701/41 |
| 2015/0344028 | A1* | 12/2015 | Gieseke | B62D 15/028 701/1 |
| 2018/0244195 | A1* | 8/2018 | Haight | B60Q 1/0023 |
| 2018/0330526 | A1* | 11/2018 | Corcoran | G06T 11/60 |

FOREIGN PATENT DOCUMENTS

| | | |
|---|---|---|
| KR | 10-2016-0131579 A | 11/2016 |
| KR | 10-2017-0018414 A | 2/2017 |

\* cited by examiner

| | Rear wide-angle camera 60m |
| | First and second rear-view cameras 100m |
| | Left and right side surveillance cameras 80m |
| | Front wide-angle camera 60m |
| | Visible light camera 150m |
| | Thermal observation device 250m |

SURROUND CAMERA SYSTEM FOR AUTONOMOUS DRIVING

BACKGROUND

1. Technical Field

The present invention relates generally to a surround camera system for autonomous driving, which can monitor a 360-degree omnidirectional region around a vehicle in real time and which can detect a target object obstructing the traveling of a vehicle even in an environment, such as fog, rain, snow, yellow dust, no light (night), backlight or the like, and can provide a warning and guidance to a driver, and more specifically to a surround camera system for autonomous driving, which can be applied to an autonomous driving vehicle and which can secure the safety of a driver.

2. Description of the Related Art

As vehicles have become essential transportation means, the development of systems for safe driving as well as the encouragement of safe vehicle driving has been performed.

In particular, as vehicles have become more intelligent, the installation of an advanced driver assistance system (ADAS) designed to assist a driver in driving has increased. Such advanced driver assistance systems (ADASs) include an adaptive cruise control (ACC) system designed to issue a warning in the event of a frontal collision, a lane departure warning system (LDWS) designed to alert a driver in the event of a departure from a lane, etc. ADASs provide emergency information to drivers via warning sounds.

Recently, there has been introduced a night vision system which provides an improved view to a driver during night driving by using visible light or far infrared rays.

The method using visible light is designed to detect visible light (having a wavelength ranging from 380 to 780 nm) via a camera and to display the detection of the visible light to a driver via a light-emitting diode (LED) or another display device, and the method using far infrared rays is designed to detect heat (having a wavelength ranging from 780 to 1,400 nm) emitted by an object via a far infrared camera and to display the detection of the heat to a driver via an LED or another display device.

However, although the method using visible light provides a natural image similar to an image via a human eye and has the advantage of being superior in cost competitiveness to the method using far infrared rays, it is problematic in that light blurring occurs (due to the headlight of an opposite vehicle), a recognition rate is low due to an environmental effect, and a recognition distance is short.

Furthermore, although the method using far infrared rays is advantageous in that a recognition rate is high due to the detection of a heating object, a longer viewing distance can be obtained than the method using visible light, and the method is not influenced by the bad weather of four seasons, it is problematic in that the equipment thereof is expensive and images acquired via the method are black-and-white images (accordingly, the colors of traffic lights cannot be identified from the images).

In other words, the method using visible light may not operate depending on a weather condition, such as rain, snow, fog, or the like, and may not operate depending on a state, such as the size or shape of a vehicle, a distance, an angle, a brake, or the like. Furthermore, when a forward vehicle decelerates rapidly in the state in which a vehicle-to-vehicle distance is short, the method using visible light may not operate. When the angle of the forward vehicle is bent or crossed, the method using visible light may not operate. The method using visible light may not recognize a target object having a shape different from that of a vehicle, such as a bridge, a guard rail, a sign, a bicycle, a motorcycle, a box, an animal, a pedestrian, and the like as well as a wall and a tree. The method using visible light operates in the state in which a forward view has been secured. In contrast, the method using visible light may not operate on a curved road or uphill road.

PRIOR ART DOCUMENTS

Patent Documents (Patent document 1) Korean Patent No. 10-1089358 entitled "Safe Driving System in which Hands-free Function and Sudden Braking Alarming Device Are Contained in Steering Wheel"

(Patent document 2) Korean Patent No. 10-1278051 entitled "Safe Driving Alarm System Based on Detection of Pedestrian at Crosswalk"

(Patent document 3) Korean Patent No. 10-1172049 entitled "Safety Alarm System for Generating Vehicle Safety Alarm Sound for Aged Driver"

SUMMARY

An object of the present invention is to provide a surround camera system for autonomous driving, which can monitor a 360-degree omnidirectional region around a vehicle in real time and which can detect a target object obstructing the traveling of a vehicle even in an environment, such as fog, rain, snow, yellow dust, no light (night), backlight, or the like, and can provide a warning and guidance to a driver.

Another object of the present invention is to provide a surround camera system for autonomous driving, which can be applied to an autonomous driving vehicle and which can secure the safety of a driver.

Still another object of the present invention is to provide a surround camera system for autonomous driving, which can detect a target object, such as an animal or pedestrian, obstructing the traveling of a vehicle, can provide a warning to a driver, and enables countermeasures to be taken against a predicted collision, based on a view secured regardless of climate conditions via a visible light camera and a thermal observation device.

In order to accomplish the above objects, the present invention provides a surround camera system for autonomous driving, including: at least one forward surveillance camera configured to monitor a region in front of a vehicle; at least one backward surveillance camera configured to monitor a region behind the vehicle; one or more side surveillance cameras configured to monitor both sides alongside the vehicle; a monitoring means configured to display each of images acquired via the forward surveillance camera, the backward surveillance camera, and the side surveillance camera, to display a combined image obtained by combining two or more of the above images, or to display a dual image including at least any one of the above images and the combined image; and a video control unit (VCU) configured to process the images acquired via the forward surveillance camera, the backward surveillance camera, and the side surveillance camera, to transmit the processed images to the monitoring means, to detect a target object obstructing the traveling of the vehicle from the acquired images, analyze the target object, and issue a warning to a driver, and to control the electronic control unit (ECU) of the vehicle; wherein a 360-degree omnidirectional region around the vehicle is monitored via the forward surveillance camera, the backward surveillance camera, and the side surveillance cameras.

The forward surveillance camera may include a visible light camera, a thermal observation device, and a front wide-angle camera.

An image acquired via the thermal observation device may be displayed in an environment in which a recognition rate for the target object based on an acquired visual light image is low, and the target object may be detected using the fact that a difference between an average temperature value on a road in a safe zone and the temperature value of the target object is high when the target object enters the safe zone.

The surround camera system of claim 1, further comprising a warning means connected to the video control unit and configured to call the driver's attention when it is determined that an emergency situation has occurred through the detection of the target object.

The surround camera system may further include a global positioning system (GPS) connected to the video control unit; and the video control unit may detect the distance between the target object and the vehicle, the traveling direction and traveling speed of the target object, the traveling direction and traveling speed of the vehicle, and the type of traffic signal light, and may provide a warning, vehicle control, and guidance regarding a preset state.

The surround camera system may further include a manual switching button configured to manually switch a current image from each of the images acquired via the forward surveillance camera, the backward surveillance camera, and the side surveillance camera, the combined image obtained by combining two or more of the above images, or the dual image including at least any one of the above images and the combined image to a desired image.

The surround camera system may further include a warning light configured to indicate an emergency situation.

The combined image may include a top view image obtained by processing the images acquired via the forward surveillance camera, the backward surveillance camera, and the side surveillance cameras.

The backward surveillance camera may include: a first rear-view camera configured to monitor the right side of a region behind the vehicle; a second rear-view camera vehicle configured to monitor the left side of the region behind the vehicle; and a rear wide-angle camera configured to monitor the overall region behind the vehicle, including the left and right sides of the region behind the vehicle.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

The present invention may be subject to various alterations, and may have various embodiments. Specific embodiments will be illustrated in the accompanying drawings, and will be described in detail.

However, this is not intended to limit the present invention to the specific embodiments, and it should be understood that the present invention encompasses all alterations, equivalents and substitutions falling within the spirit and technical range of the present invention. In the descriptions of the accompanying drawings, like reference symbols are used to designate like components.

Although the terms "first," "second," etc. may be used to describe various components, the components should not be limited by these terms.

These terms are each used only to distinguish one component from other components. For example, a first component may be termed a second component without departing from the scope of the present invention, and, in a similar way, a second component may be termed a first component. As used herein, the term "and/or" includes any or all combinations of one or more of associated listed items.

It should be understood that when one component is described being "connected to" or "coupled to" another component, it may be connected or coupled directly to the other component or may be connected or coupled to the other component with a third component intervening therebetween. In contrast, it should be understood that when one component is described as being "connected directly to" or "coupled directly to" another component, it may be connected or coupled to the other component without a third component intervening therebetween.

The terms used herein are used to illustrate a specific embodiment, and are not intended to limit the present invention. A singular description includes a plural description unless otherwise defined. In the present specification and the attached claims, it should be appreciated that the terms "include," "comprise," "have" and their derivatives are intended to designate the presence of features, numbers, steps, operations, components, parts or combinations thereof described in the specification or the attached claims, but are not intended to exclude the possibility of presence or addition of one or more other features, numbers, steps, operations, components, parts, or combinations thereof in advance.

Unless otherwise defined, all the terms used herein, including technical or scientific terms, have the same meanings as understood by those having ordinary knowledge in the technical field to which the present invention pertains. The terms commonly used and defined in dictionaries should be interpreted as having meanings identical to those specified in the context of related technology. Unless definitely defined therein, the terms should not be interpreted as having ideal or excessively formative meanings.

Embodiments of the present invention will be described in detail below with reference to the accompanying drawings.

Figure 1:
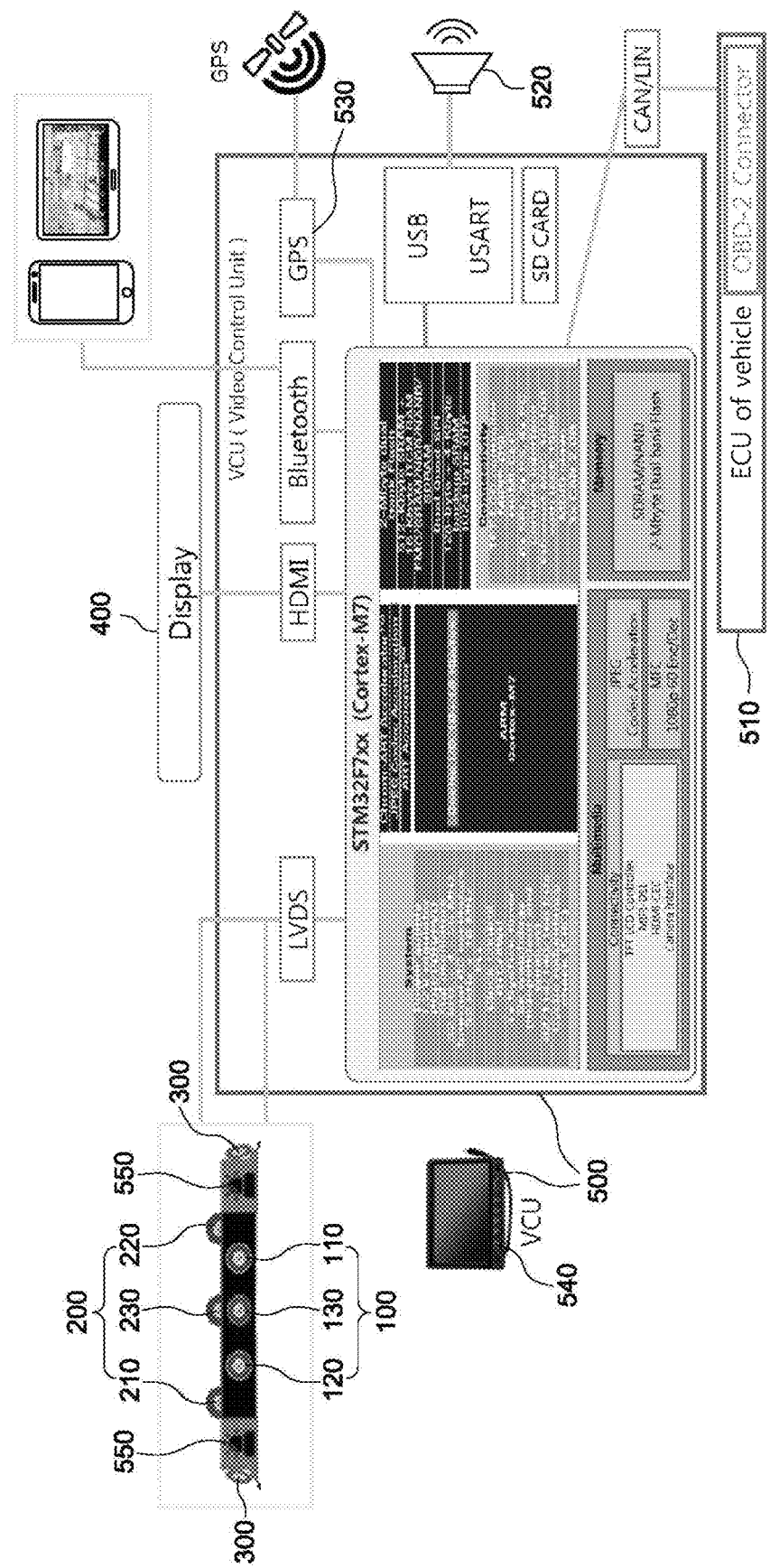
FIG. 1 is a view conceptually showing the overall configuration of a surround camera system for autonomous driving according to the present invention.
Figure 2:
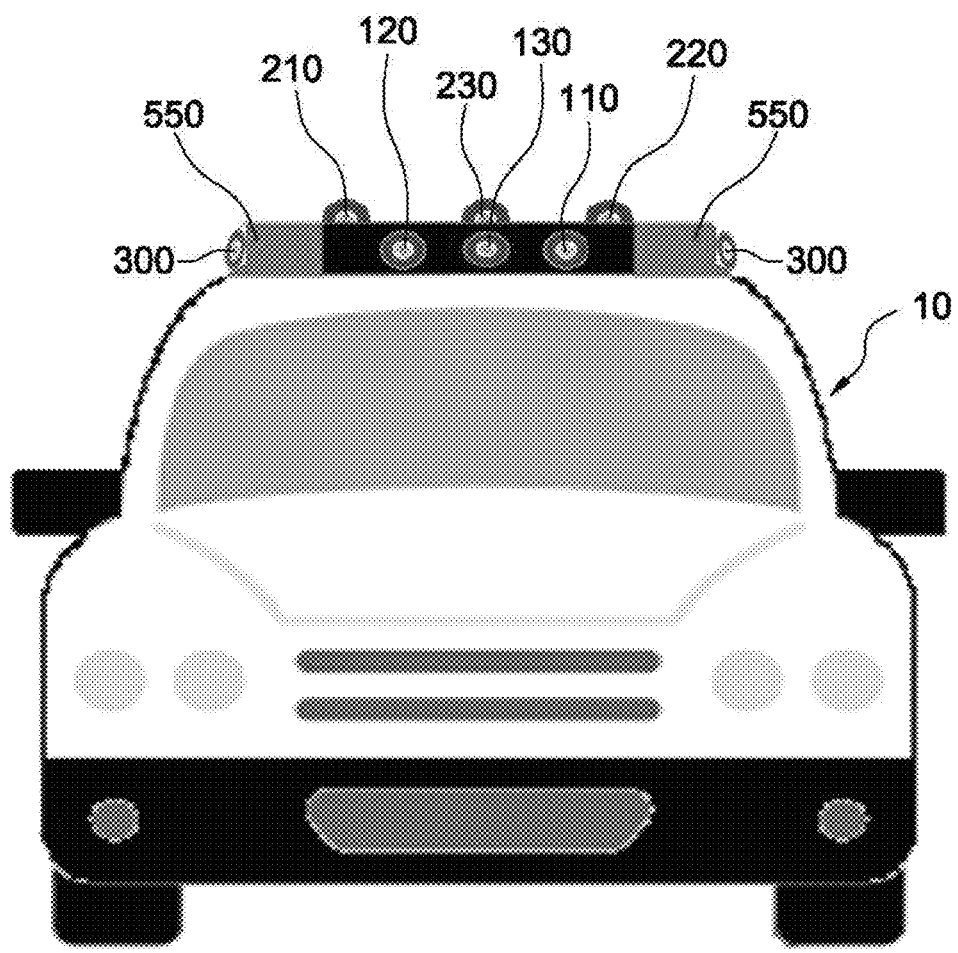
FIG. 2 is a view showing an embodiment of a state in which a forward surveillance camera, a backward surveillance camera, and side surveillance cameras used for the surround camera system for autonomous driving according to the present invention have been mounted.
Figure 3:
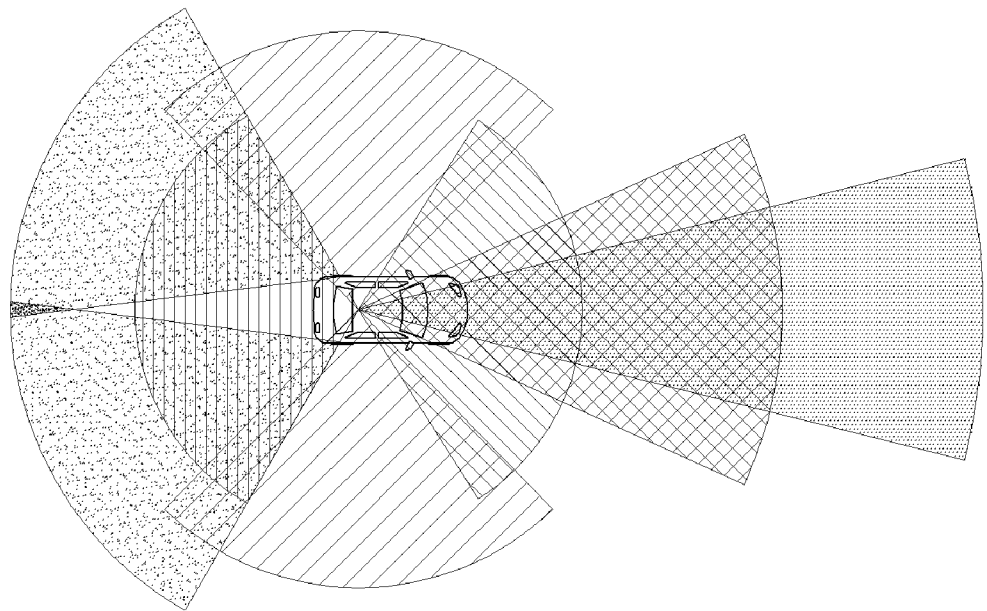
FIG. 3 is a view showing the angles of view and recognition distances of the cameras of the surround camera system for autonomous driving according to the present invention.
Figure 4:
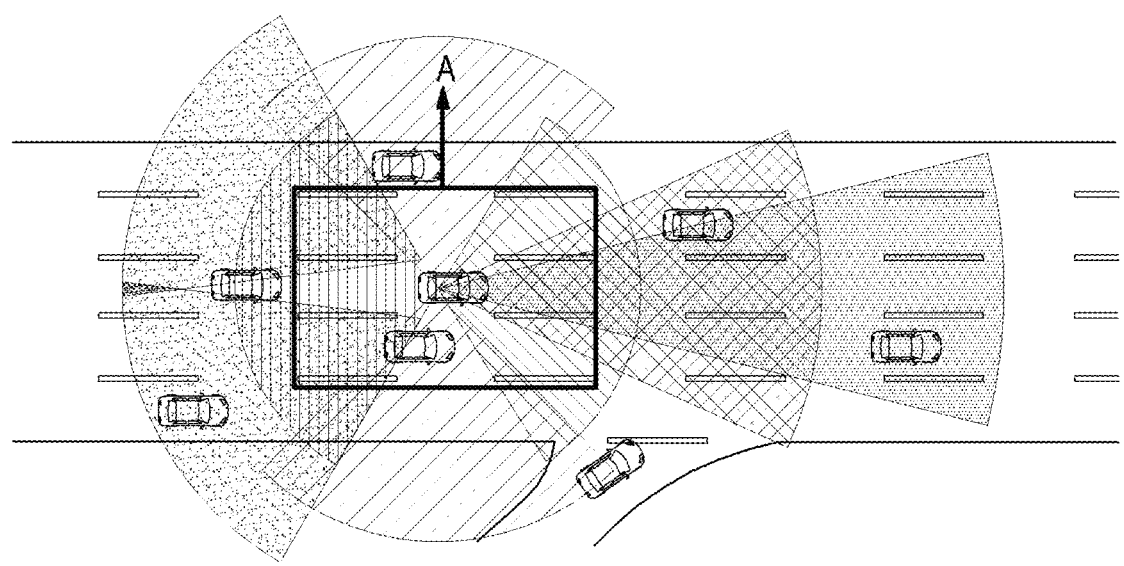
FIG. 4 is a view showing a case where a vehicle equipped with the surround camera system for autonomous driving according to the present invention has been applied to traveling on a road.

FIG. 1 is a view conceptually showing the overall configuration of a surround camera system for autonomous driving according to the present invention, FIG. 2 is a view showing an embodiment of a state in which a forward surveillance camera, a backward surveillance camera, and side surveillance cameras used for the surround camera system for autonomous driving according to the present invention have been mounted, FIG. 3 is a view showing the angles of view and recognition distances of the cameras of the surround camera system for autonomous driving according to the present invention, and FIG. 4 is a view showing a case where a vehicle equipped with the surround camera system for autonomous driving according to the present invention has been applied to traveling on a road.

The surround camera system for autonomous driving according to the present invention will be described below with reference to FIGS. 1 to 4.

The present invention is directed to a surround camera system for autonomous driving which can secure the forward view of a vehicle driver regardless of weather and climate conditions, which can guide a vehicle driver through safe driving, and which can be also applied to autonomous driving.

Referring to FIG. 1, the surround camera system for autonomous driving according to the present invention is configured to include a forward surveillance camera 100, a backward surveillance camera 200, side surveillance cameras 300, a monitoring means 400, and a video control unit 500.

The forward surveillance camera 100 includes at least one camera configured to monitor a region in front of a vehicle 10. In the present specification, there is proposed the forward surveillance camera 100 configured to include a visible light camera 120, a thermal observation device 110, and a front wide-angle camera 130.

The visible light camera 120 may be a camera using a visible light sensor. Since this corresponds to well-known technology, a detailed description thereof is omitted.

The thermal observation device 110 may be a camera using a thermal observation device (TOD) sensor. Since this corresponds to well-known technology, a detailed description thereof is omitted.

The front wide-angle camera 130 is configured to monitor an overall region in front of the vehicle 10. It is preferable to use a fisheye lens camera as the front wide-angle camera 130.

The backward surveillance camera 200 may include at least one camera configured to monitor a region behind the vehicle 10. In the present specification, the backward surveillance camera 200 including a first rear-view camera 210, second rear-view camera 220, and a rear wide-angle camera 230 is illustrated as an embodiment.

Each of the first rear-view camera 210 and the second rear-view camera 220 may be a camera using a complementary metal oxide semiconductor (CMOS) sensor. It is preferable to use a fisheye lens camera as the rear wide-angle camera 230 configured to monitor an overall backward region.

The side surveillance cameras 300 include one or more cameras configured to monitor both sides (left and right sides) of the vehicle 10. The side surveillance cameras 300 disposed on the left and right sides of the vehicle 10 are proposed as an embodiment.

Each of the side surveillance cameras 300 may be a camera using a complementary metal oxide semiconductor (CMOS) sensor.

The monitoring means 400 is installed inside the vehicle 10, and can be viewed by a driver. The monitoring means 400 displays each of the images acquired via the forward surveillance camera 100, the backward surveillance camera 200, and the side surveillance cameras 300, displays an image acquired by combining two or more of the above images, or displays a dual image including at least any one of the above images and the combined image.

In other words, the monitoring means 400 displays each of the images acquired from the respective cameras, displays an image acquired by combining and converting two or more of the above images, or displays at least any one of the images acquired via the respective cameras and the converted image as a dual image. In this case, the term "dual" refers to two or more screens.

Furthermore, the images acquired via the visible light camera 120 and the thermal observation device 110 are analyzed via the video control unit 500 under a climate condition, such as dark night, rain, snow, fog, yellow dust, backlight, or the like, and are provided to a driver as screens capable of improving a recognition rate for a target object.

In other words, during a dark night, a recognition rate for a target object can be increased using an image acquired via the thermal observation device 110. An image acquired via the thermal observation device 110, rather than an image acquired via the visible light camera 120, is provided.

However, during a night, a recognition rate for a target object can be increased by an image acquired via a thermal observation device 110, and the color of a signal light cannot be identified via the image. It is preferable to provide a dual image such that a recognition rate for a target object can be increased and also a signal light can be accurately identified via an image acquired via the thermal observation device 110 and an image acquired via the visible light camera 120.

The video control unit (VCU) 500 processes images acquired via the forward surveillance camera 100, the backward surveillance camera 200, and the side surveillance cameras 300, transmits the processed images to the monitoring means 400, detects a target object obstructing the traveling of the vehicle 10 from the acquired images, analyzes the target object, issues a warning to a driver, and controls the electronic control unit (ECU) 510 of the vehicle 10.

Referring to FIG. 2, there is shown a state in which the cameras according to the present invention have been mounted on the vehicle 10. The cameras may be modularized into a single component and then mounted on the vehicle 10, or may be individually mounted on the vehicle 10. The arrangement and mounting of the cameras may vary depending on the state and environment of the vehicle 10 in various manners.

However, the present invention is configured to monitor a 360-degree omnidirectional region around the vehicle 10 via the forward surveillance camera 100, the backward surveillance camera 200 and the side surveillance cameras 300, and thus it is preferred that the front wide-angle camera 130 is installed on the upper portion of the center of the windshield of the vehicle 10 in order to set a reference point for images.

Referring to FIG. 3, the angles of view and recognition distances of the cameras according to the present invention can be seen. It is preferred that the angle of view of the thermal observation device 110 ranges from 20 to 40 degrees, the angle of view of the visible light camera 120 ranges from 50 to 70 degrees, the angle of view of each of the front wide-angle camera 130 and the rear wide-angle camera 230 ranges from 110 to 130 degrees, the angle of view of each of the first rear-view camera 210 and the second rear-view camera 220 ranges from 75 to 85 degrees, and the angle of view of the side surveillance camera 300 ranges from 80 to 100 degrees.

The recognition distances of the respective cameras are shown in the drawings. The angles of view of the respective cameras are configured as described above, and thus the cameras can monitor a 360-degree omnidirectional region around the vehicle 10.

In this case, it is preferable to provide the combined image in the form of a top view image obtained by converting images acquired via the forward surveillance camera 100, the backward surveillance camera 200, and the side surveillance cameras 300.

Referring to FIG. 4, an image of zone "A," i.e., a space including side lanes on the left and right sides of the traveling lane of the vehicle 10 and areas on the front and back sides of the vehicle 10, is provided in the form of a top view image. A driver can easily recognize a vehicle, approaching his or her vehicle 10, via the monitoring means 400 by using the top view image.

Furthermore, when a target object, such as another traveling vehicle located within a recognition distance, a joining traveling vehicle, or the like, appears in an image acquired via each of the cameras, the distance between the target object and the vehicle 10, the traveling direction and traveling speed of the target object, the traveling direction and traveling speed of the vehicle 10, and the type of traffic signal light are detected and a warning, vehicle control, and guidance regarding a preset state are provided, via the video control unit 500 connected to the GPS 530.

Furthermore, a warning means 520, such as a monitor popup, a flicker, a speaker, or the like, is connected to the video control unit 500. A warning is provided to a driver in such a way that a target object is detected from the images acquired via the cameras and a warning is issued to call the driver's attention when an emergency situation occurs.

As an example, the video control unit 500 measures a vehicle traveling speed via a GPS 530, and sets a safe zone (a safe distance) for the vehicle traveling speed. In other words, the safe distance may be set to 30 m for a speed of 30 km/h, the safe distance may be set to 60 m for a speed of 60 km/h, and the safe distance may be set to 100 m for a speed of 100 km/h.

Accordingly, the safe distance previously set for the vehicle traveling speed is recognized, and a vehicle traveling speed at the moment a target object is detected is measured via the GPS 530 when the target object is detected within the safe distance. When the measured vehicle traveling speed exceeds a speed based on the safe distance, a warning is issued to a driver via at least any one of a monitor and a speaker depending on the vehicle traveling speed. In the case of the monitor, a warning may be issued to a driver by using one or more methods, such as a popup window, a flicker, a flicker of a red screen, and/or the like. In the case of the speaker, a warning may be issued to a driver by using one or more of well-known various methods, such as a warning sound, a speed reduction announcement, and/or the like.

Furthermore, in addition to the control regarding the safe zone (the safe distance), when the yellow or red signal of traffic signal lights is detected, the distance to the vehicle 10 may be determined, a vehicle traveling speed may be measured, and a warning may be issued using a method identical to the above-described method.

Meanwhile, when the vehicle traveling speed is not reduced after a warning has been issued to the driver, the vehicle traveling speed may be reduced to a preset state in a stepwise manner by controlling the electronic control unit 510 mounted on the vehicle 10. Since the electronic control unit 510 is connected to the video control unit 500, the electronic control unit 510 may be controlled via the video control unit 500. During the stepwise reduction of the speed, a driver is prompted to recognize a surrounding situation and take measures by herself or himself by primarily calling a driver's attention via automatic braking.

Furthermore, when measures are not taken by a user after automatic braking has been performed one or more times, automatic braking is successively performed for each predetermined distance. Control is performed such that the vehicle 10 can be completely stopped in front of a target object before the occurrence of a bump.

As described above, a recognition rate for a target object is increased and countermeasures against an emergency situation are automatically taken, and thus a vehicle is guided through safe autonomous driving and the safety of a driver and a pedestrian can be improved.

Meanwhile, when a target object is detected within a safe zone during the traveling of the vehicle in a dark night, the target object is detected by analyzing a difference in temperature via the thermal observation device 110.

In other words, a temperature within the safe zone is chiefly the temperature of the traveling road of the vehicle, and a difference in temperature is small across the traveling road. When another vehicle, a human, an animal, or the like enters within a safe distance, a difference in temperature between the entering object and the traveling road increases. Accordingly, a target object can be immediately recognized via the difference in temperature, and thus a recognition rate for a target object can be improved.

Furthermore, there may be further included a communication means, such as a Bluetooth means or the like, connected to the video control unit 500. The surround camera system may be configured to operate in cooperation with a smartphone or navigation system via the communication means. The cooperative operation with the smartphone and the navigation including mirroring, etc. corresponds to well-known technology, and thus a detailed description thereof is omitted.

Meanwhile, referring to FIG. 1, a manual switching button 540 connected to the video control unit 500 may be provided, and may be used to manually switch a current image from each of the images acquired via the forward surveillance camera, the backward surveillance camera, and the side surveillance camera, the combined image obtained by combining two or more of the above images, or the dual image including at least any one of the above images and the combined image to a desired image. Although an embodiment is conceptually shown in the drawing, the location, shape, size, type, etc. of the manual switching button 540 may be subject to various modifications within the scope of well-known technology.

Furthermore, a warning light 550 configured to indicate an emergency situation is further provided, and thus separate equipment, such as a warning triangle or the like, is not required in the case of an accident or emergency situation and information about the accident or emergency situation can be rapidly transferred to surrounding vehicles.

According to the above-described present invention, an image of a 360-degree omnidirectional region around a vehicle can be acquired via a plurality of cameras configured to monitor front, rear and side regions in front of, behind and alongside the vehicle, a target object obstructing the traveling of the vehicle can be identified through the analysis of the acquired image, a warning can be issued to a driver, and the vehicle can be safely guided by controlling the electronic control unit of the vehicle when countermeasures are not taken after the issuance of the warning.

Furthermore, images acquired via the visible light camera and the thermal observation device are provided, so that a highly recognizable image and information about forward safety can be provided to a driver regardless of weather and climate conditions (such as backlight, fog, snow, rain, yellow dust, night, etc.).

Furthermore, the distance between a target object and a vehicle, the traveling direction and traveling speed of the target object, the traveling direction and traveling speed of the vehicle, and the type of traffic signal light can be detected and a warning, vehicle control, and guidance regarding a preset state can be provided, so that the technical level of an advanced driver assistance system (ADAS) at its early stage can be improved.

Furthermore, automatic image provision can be performed depending on a climate environment, and a user can easily switch a current image to a desired image via a manual switching button.

Furthermore, the warning light is provided, so that separate equipment, such as a warning triangle or the like, is not required in the case of an accident or emergency situation and information about the accident or emergency situation can be rapidly transferred to surrounding vehicles.

Moreover, an image of a 360-degree omnidirectional region around a vehicle is provided in the form of a top view image, so that a situation around the vehicle can be rapidly and easily detected.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A surround camera system for autonomous driving, comprising:
   at least one forward surveillance camera configured to monitor a region in front of a vehicle;
   at least one backward surveillance camera configured to monitor a region behind the vehicle;
   one or more side surveillance cameras configured to monitor both sides alongside the vehicle;
   a monitoring means configured to display each of images acquired via the forward surveillance camera, the backward surveillance camera, and the side surveillance camera, to display a combined image obtained by combining two or more of the above images, or to display a dual image including at least any one of the above images and the combined image;
   a video control unit (VCU) configured to process the images acquired via the forward surveillance camera, the backward surveillance camera, and the side surveillance camera, to transmit the processed images to the monitoring means, to detect a target object obstructing traveling of the vehicle from the acquired images, analyze the target object, and issue a warning to a driver, and to control an electronic control unit (ECU) of the vehicle;
   a warning means connected to the video control unit and configured to call the driver's attention when it is determined that an emergency situation has occurred through detection of the target object;
   a global positioning system (GPS) connected to the video control unit;
   a manual switching button configured to manually switch an image from each of the images acquired via the forward surveillance camera, the backward surveillance camera, and the side surveillance camera, the combined image obtained by combining two or more of the above images, or the dual image including at least any one of the above images and the combined image to a desired image; and
   a warning light configured to indicate the emergency situation,
   wherein the forward surveillance camera comprises a visible light camera, a thermal observation device (TOD), and a front wide-angle camera;
   wherein the backward surveillance camera comprises:
   a first rear-view camera configured to monitor a right side of a region behind the vehicle,
   a second rear-view camera vehicle configured to monitor a left side of the region behind the vehicle, and
   a rear wide-angle camera configured to monitor the overall region behind the vehicle, including the left and right sides of the region behind the vehicle;
   wherein the forward surveillance camera, the backward surveillance camera, and the side surveillance cameras are modularized into a single component and then mounted on a roof panel of the vehicle;
   wherein the side surveillance cameras are disposed on left and right sides of the single component;
   wherein a 360-degree omnidirectional region around the vehicle is monitored via the forward surveillance camera, the backward surveillance camera, and the side surveillance cameras;
   wherein an image acquired via the TOD is displayed in an environment in which a recognition rate for the target object based on an acquired visual light image is low, and the target object is detected using a fact that a difference between an average temperature value on a road in a safe zone and a temperature value of the target object is high when the target object enters the safe zone;
   wherein the video control unit detects a distance between the target object and the vehicle, a traveling direction and traveling speed of the target object, a traveling direction and traveling speed of the vehicle, and a type of traffic signal light, and provides a warning, vehicle control, and guidance regarding a preset state;
   wherein the combined image comprises a top view image obtained by processing the images acquired via the forward surveillance camera, the backward surveillance camera, and the side surveillance cameras;
   wherein each of the front wide-angle camera and the rear wide-angle camera is a fisheye lens camera;
   wherein each of the first rear-view camera, the second rear-view camera, and the side surveillance cameras is a camera using a complementary metal oxide semiconductor (CMOS) sensor;
   wherein an angle of view of the TOD ranges from 20 to 40 degrees, an angle of view of the visible light camera ranges from 50 to 70 degrees, an angle of view of each of the front wide-angle camera and the rear wide-angle camera ranges from 110 to 130 degrees, an angle of view of each of the first rear-view camera and the second rear-view camera ranges from 75 to 85 degrees, and an angle of view of the side surveillance camera ranges from 80 to 100 degrees; and wherein, during a night or under adverse weather conditions, both images acquired via the visible light camera and the TOD are provided.

* * * * *